(12) United States Patent
Hopf et al.

(10) Patent No.: US 11,945,141 B2
(45) Date of Patent: Apr. 2, 2024

(54) METHOD FOR PRODUCING FOAMED FLAT MOLDINGS AND MOLD FOR CARRYING OUT SAID METHOD

(71) Applicant: Covestro Deutschland AG, Leverkusen (DE)

(72) Inventors: Stefan Hopf, Monheim (DE); Stephan Moers, Brüggen (DE); Achim Wick, Cologne (DE); Christian Windeck, Viersen (DE)

(73) Assignee: Covestro Deutschland AG, Leverkusen (DE)

(*) Notice: Subject to any disclaimer, the term of this patent is extended or adjusted under 35 U.S.C. 154(b) by 156 days.

(21) Appl. No.: 17/608,233

(22) PCT Filed: Jan. 11, 2021

(86) PCT No.: PCT/EP2021/050371
§ 371 (c)(1),
(2) Date: Nov. 2, 2021

(87) PCT Pub. No.: WO2021/144218
PCT Pub. Date: Jul. 22, 2021

(65) Prior Publication Data
US 2022/0347897 A1    Nov. 3, 2022

(30) Foreign Application Priority Data
Jan. 17, 2020 (EP) .................................... 20152534

(51) Int. Cl.
*B29C 44/42* (2006.01)
*B29C 44/04* (2006.01)
(Continued)

(52) U.S. Cl.
CPC ............ *B29C 44/428* (2013.01); *B29C 44/04* (2013.01); *B29C 44/588* (2013.01); *B29K 2075/00* (2013.01)

(58) Field of Classification Search
CPC ......... B29C 70/48; B29C 51/36; B29C 51/10; B29C 2045/1745; B29C 2045/14155;
(Continued)

(56) References Cited

U.S. PATENT DOCUMENTS 10,322,534 B2   6/2019   Costeux et al.
2006/0103042 A1   5/2006   Tanaka et al.
(Continued)

FOREIGN PATENT DOCUMENTS

DE   102014202890 A1   8/2015
KR   100684809 B1   2/2007
(Continued)

OTHER PUBLICATIONS

International Search Report, PCT/EP2021/050371, dated Apr. 20, 2021, Authorized officer: Klaus Ullrich.

*Primary Examiner* — Stella K Yi
(74) *Attorney, Agent, or Firm* — Donald R. Palladino

(57) ABSTRACT

The invention relates to a method for the production of foamed areal polyurethane(PUR)/polyisocyanurate(PIR) moldings, where a polyurethane/polyisocyanurate reaction mixture is injected into a mold that is under elevated pressure and then a depressurization takes place, and the foaming process is thus induced, and after the reaction the molding is demolded, and to a mold for carrying out the method.

6 Claims, 3 Drawing Sheets

(51) Int. Cl.
*B29C 44/58* (2006.01)
*B29K 75/00* (2006.01)

(58) Field of Classification Search
CPC . B29C 2043/3605; B29C 39/42; B29C 33/18; B29C 44/588; B29C 44/04; B29C 44/428
See application file for complete search history.

(56) References Cited

U.S. PATENT DOCUMENTS

| | | |
|---|---|---|
| 2012/0308804 A1 | 12/2012 | Lendlein et al. |
| 2018/0345544 A1 | 12/2018 | Darland et al. |
| 2020/0017624 A1 | 1/2020 | Hahn et al. |
| 2020/0080767 A1 | 3/2020 | Schornstein et al. |
| 2021/0086412 A1 | 3/2021 | Darland et al. |

FOREIGN PATENT DOCUMENTS

| | | |
|---|---|---|
| WO | 2007099445 A2 | 9/2007 |
| WO | 2013075991 A1 | 5/2013 |

METHOD FOR PRODUCING FOAMED FLAT MOLDINGS AND MOLD FOR CARRYING OUT SAID METHOD

CROSS-REFERENCE TO RELATED APPLICATIONS

This application is a national stage application under 35 U.S.C. § 371 of PCT/EP2021/050371, filed Jan. 11, 2021, which claims the benefit of European Application No. 20152534.2, filed Jan. 17, 2020, each of which is incorporated herein by reference.

FIELD

The invention relates to a method for the production of foamed areal polyurethane(PUR)/polyisocyanurate(PIR) moldings, where a polyurethane/polyisocyanurate reaction mixture is injected into a mold that is under elevated pressure and then a depressurization takes place, and the foaming process is thus induced, and after the reaction the molding is demolded, and to a mold for carrying out the method.

BACKGROUND

Foamed, open-cell and areal moldings have excellent stability as core materials for, for example, vacuum insulation panels (VIP). These are excellent thermal insulators whose insulation effect results in particular from a vacuum within the panels. Collapse of the panel under vacuum is prevented by the core material, for example a polyurethane/polyisocyanurate matrix with very substantially open foam cells. Typical examples of application for foamed areal bodies are metal panels and isoboards for insulation in buildings, and walls of refrigeration equipment. Refrigeration equipment makes particularly widespread use of vacuum insulation panels for thermal insulation, for example in domestic refrigerators. A manufacturing variant in the prior art provides by way of example that the starting mixture consisting of polyol, isocyanate, additives and supercritical $CO_2$ or pressurized blowing agent for the formation of the polyurethane/polyisocyanurate matrix is injected into a mold that has been filled with gas (e.g. air or nitrogen) and is under superatmospheric pressure. The superatmospheric pressure is then reduced by way of a controlled depressurization, and consequently the blowing agent dissolved in the liquid PUR/PIR reaction mixture vaporizes, and the foaming process begins. By selection of suitable depressurization parameters it is possible to influence production of foam and important properties of the foam, for example cell structure; this in turn has an effect on the thermal and mechanical properties of the VIP.

Production of a foam by depressurization is widely described in the literature:

WO18/162372 describes a method for the production of open-cell and very fine-cell rigid PUR/PIR foams. The method steps consist of the introduction of the reaction mixture with supercritical $CO_2$ as blowing agent into a mold, foaming in the mold and demolding. In a preferred embodiment, the mold is under internal pressure, which is reduced in controlled manner after the injection. The depressurization is achieved within a period of 1 to 40 s with depressurization rates up to 90 bar/s. WO11/085847 A1 describes the production of a foam molding with desired anisotropic shape-memory properties, and also the foam molding itself. The molding produced comprises at least one shape-memory polymer which has a foam structure. The cells are asymmetrically oriented (aspect ratio>2), and in essence orient themselves in one spatial direction. The polymer melt (e.g. TPU) with admixed blowing agent in a mold cavity achieves an asymmetrical cell orientation with shape-memory effect via release of the blowing agent during a depressurization of a pressure chamber. The depressurization is initiated by way of valves, and takes place at up to 25 bar/s. It is moreover stated that the mold cavity within the pressure chamber is open toward the side in which the foam is mainly intended to expand. Anisotropic mechanical properties are obtained in the molding, corresponding to cell orientation of the foam. The depressurization process and its effect on foam orientation are not described in any more detail; in particular, no account is taken of the effect of the geometry of the cavity on the flow behavior of the foam during the depressurization.

WO13/075991 A1 in particular describes a process for the production of nanoporous polymer foams made of thermoplastic polymer with supercritical blowing agent and with very high depressurization rates (15 000 to 2 000 000 MPa/s). Steps of the process are the addition of a supercritical blowing agent with thermoplastic polymer, the temperature-control of the polymer melt with additive, a depressurization, and also the possible comminution of the foam to give foam particles. The depressurization can preferably take place continuously in the extruder or batchwise in the autoclave. In the case of the continuous process, the depressurization takes place at a die plate with narrow dies through which the melt is pressed. The pressurized component therefore serves simultaneously for shaping of the melt. In the batchwise variant in the autoclave, the depressurization takes place by way of valves, bursting disks or cavity volume increase. No description is provided in relation to establishment of cell sizes and cell orientation, in particular resulting from the geometry of the mold and the connection to the depressurization equipment (e.g. valve). Said method requires a supercritical blowing agent, and also very high depressurization rates; contact with the process is therefore subject to restrictions.

WO 2007/099445 A2 describes the production of a foam molding by means of a mold. During outflow of air from the mold, the outflow location is closed in relation to the surroundings by a shutter element which is moved by the rising foam. Because during the injection of the polymer mixture the shutter is not closed in relation to the surroundings, the cavity cannot be subjected to superatmospheric pressure, whereas superatmospheric pressure would be advantageous for control of foaming and of cell orientation.

WO18/222714 A1 describes the injection of a single-phase solution made of a polymer composition and of a gas into a mold which is under superatmospheric pressure, and also depressurization for the production of a foam. The depressurization is realized either by way of a volume expansion or by way of a pressure regulator.

WO2015/183639 A1 describes a mold and conduct of a process in which the expansion of the foam (=volume expansion) in the mold is achieved by increasing the volume of the cavity by means of a movable wall of the mold and inherent depressurization. The process provides the injection of a polymer mixture into a pressurized cavity and depressurization via controlled movement of a wall in a manner similar to that of a piston. Movable parts are disadvantageous because, in particular in pressurized processes, these are susceptible to leaks and undefined pressure reduction, and require additional drives. There is moreover nothing to indicate that consideration has been given to the possible effect of depressurization parameters of the orientation of the cells.

SUMMARY

It was also an object to provide a method and, respectively, a mold with which it is possible in simple manner to permit complete filling of the cavity and to reduce inhomogeneities in the foam, for example preferential orientations or major anisotropy on the foam cells in certain regions of the molding, because greater homogeneity of the cell structure has a favorable effect on the significant properties of the component, for example thermal insulation capability and mechanical stability. The intention here was that there be no increase in production time in comparisons made with the method corresponding to the prior art.

Surprisingly, it was possible to achieve this object via the method described below and the mold described below.

BRIEF DESCRIPTION OF THE DRAWINGS

Various features and characteristics of the inventions described in this specification may be better understood by reference to the accompanying figures, in which.

DETAILED DESCRIPTION

Figure 1:
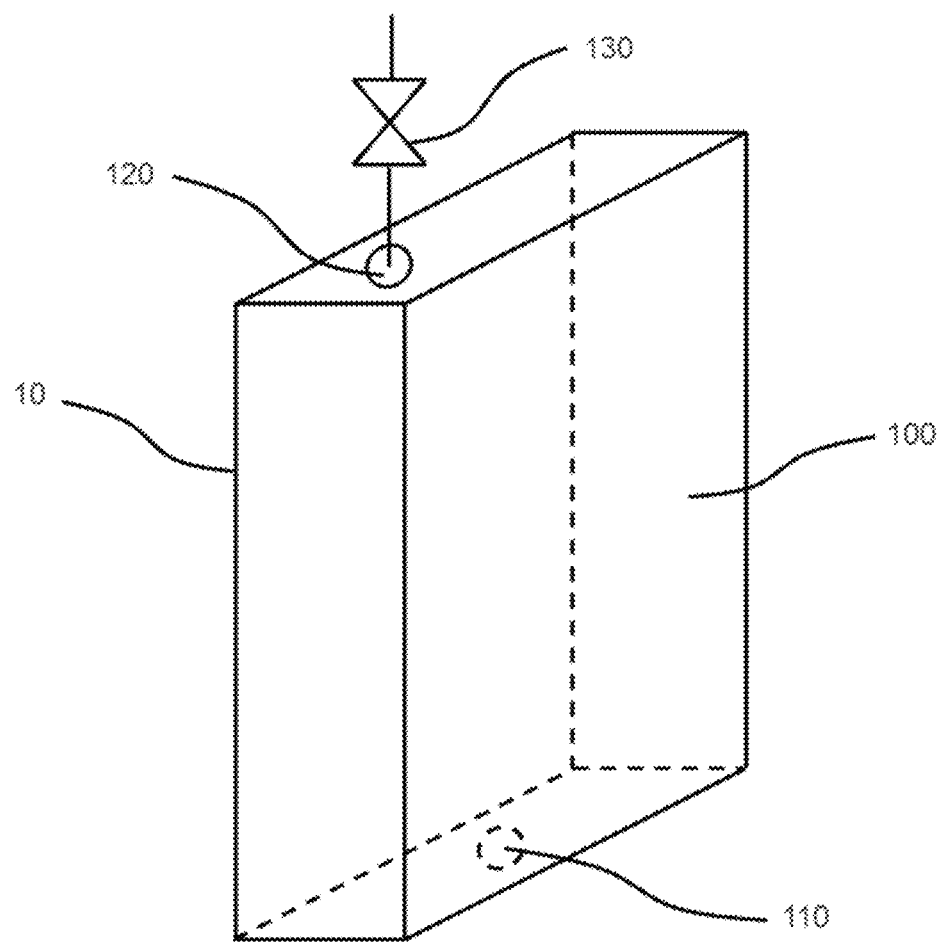
FIG. 1 illustrates a known molding (10) which has a cavity (100), an inlet aperture (110) and a valve (130)

The invention provides a method for the production of foamed areal polyurethane/polyisocyanurate (PUR/PIR) moldings with a thickness (LF2) in a cavity of a mold which comprises an inlet region, a cavity and a pressurization unit, where the method comprises the following steps:
  i) injection of a polyurethane/polyisocyanurate reaction mixture through at least one inlet aperture in the inlet region into the cavity of the mold, said cavity being under an initial pressure of 5 bar to 40 bar, preferably of 6 bar to 30 bar, particularly preferably of 7 bar to 25 bar,
  ii) after the injection of the polyurethane/polyisocyanurate reaction mixture, carrying out a depressurization in the cavity with a duration of 0.1 to 10 seconds, preferably 0.2 to 2 seconds, by means of at least one valve in the depressurization unit, to atmospheric pressure or to a pressure which is lower than the initial pressure and which is 1 bar to 5 bar, preferably 1 bar to 2 bar, wherein the reaction mixture foams along a main flow direction from the inlet region through the cavity to the depressurization unit,
  iii) hardening, cooling and demolding of the foamed areal polyurethane/polyisocyanurate molding, characterized in that
  the cavity has two long dimensions (LF1) and (LF3) and one dimension (LF2) that is short in comparison therewith, and one of the long dimensions (LF3) represents the main flow direction of the foam,
  the cavity has at least one wall (A3) in the plane which contains the dimensions (LF1) and (LF2), or has at least one portion (K2) of a wall (A2) in the plane which contains the dimensions (LF1) and (LF3), where the portion (K2) of a wall (A2) corresponds to the area which extends in the dimension (LF3) across that one-tenth part of the wall (A2) that is opposite to the inlet region, and where the at least one wall (A3) or at least one portion (K2) of a wall (A2) has at least one aperture (340) which connects the cavity (100) and the depressurization unit (300),
  the ratio of the sum of the areas of the at least one aperture to the area of the wall (A3) comprising said aperture or of the portion (K2) of a wall (A2), where said portion (K2) comprises said aperture, is 1:20 to 1:100,
  the at least one aperture has a length (LS1) in the direction of the long dimension (LF1) of the cavity, and the ratio of the length or, respectively, of the sum of the length of the at least one aperture (LS1) to the length of the cavity (LF1) is greater than 1:4, preferably greater than 1:2, particularly preferably greater than 3:4.

The dimensions (LF1) and (LF3) are each greater than (LF2). For the purposes of this application, the statement that the dimension (LF2) is short in comparison with the dimensions LF1 and LF3 means that it is respectively at most half as long as LF1 and LF3. It is preferable that the ratio of (LF1) to (LF2), and also the ratio of (LF3) to (LF2) is respectively mutually independently greater than 3, particularly preferably greater than 6.

The apertures connecting the cavity to the depressurization unit preferably have an aspect ratio of at least 2, particularly preferably at least 5.

The main flow direction of the reaction mixture preferably corresponds to the principal dimension of the cavity.

The location of the at least one aperture is preferably in a wall (A3) that, in the main flow direction, is opposite to the region comprising the inlet aperture.

However, the location of the at least one aperture can also be in an other wall. Its location is then preferably in a portion (K2) of an other wall, where the portion (K2) corresponds to the region that extends in the dimension (LF3) across that one-tenth part of the dimension (LF3) that is opposite to the inlet aperture. Again in that case there is a depressurization unit adjacent to the at least one aperture.

For the purposes of this application, the area A of the wall W is the area within the perimeter of the wall. By way of example, therefore, a rectangular wall with the edges a and b of the length 1 m and respectively, 2 m has an area $A = a*b = 2\ m^2$, irrespective of any apertures that may be present in the wall W.

For the purposes of this invention, the duration of the depressurization is the period within which the pressure in the cavity is reduced from a high pressure to a low pressure.

The depressurization is preferably carried out 0 to 20 seconds after the injection of the polyurethane/polyisocyanurate reaction mixture.

The mold is temperature-controllable. Usual temperatures of the mold are between 20 and 80° C.

Design of the inlet region can vary. By way of example, there can be a central gate system provided, in particular with baffle plate, or a diaphragm gating system, or a coplanar gate system. These gating systems are known per se. An advantageous arrangement provides a sprue-type gating system with deflection system, restrictor region and convergent cross-section increase.

The invention further provides a mold for the production of foamed areal polyurethane/polyisocyanurate moldings with a thickness (LF2), where said mold has
(i) an inlet region with at least one inlet aperture (110, 210),
(ii) an adjacent cavity (100),
(iii) a depressurization unit with at least one valve (130, 310), characterized in that
the cavity (100) has two long dimensions (LF1) and (LF3) and one dimension (LF2) that is short in comparison thereto,
the cavity has a wall (A3) in the plane which contains the dimensions (LF1) and (LF2), or has a portion (K2) of a wall (A2) in the plane which contains the dimensions (LF1) and (LF3), where the portion (K2) of a wall (A2) corresponds to the area which extends in the dimension (LF3) across that one-tenth part of the wall (A2) that is opposite to the inlet region, and where the wall (A3) or the portion (K2) of a wall (A2) has at least one aperture (340) which connects the cavity (100) and the depressurization unit (300),
the ratio of the sum of the areas of the at least one aperture (340) to the area of the wall (A3) comprising said aperture or of the portion (K2) of a wall (A2), where said portion (K2) comprises said aperture, is 1:20 to 1:100,
the at least one aperture (340) has a length (LS1) in the direction of the long dimension (LF1) of the cavity (100),
the ratio of the length or, respectively, of the sum of the length of the at least one aperture (LS1) to the length (LF1) of the cavity (100) is greater than 1:4, preferably greater than 1:2, particularly preferably greater than 3:4.

The expression "areal moldings" means bodies which have been shaped in a cavity and whose one dimension is small in comparison with the other two dimensions. These can be panels or tubes or hollow cylinders, respectively, where the panel thickness or tube thickness, respectively. is the dimension that is small in comparison to the other two dimensions. The panel thickness (LF2) can vary along the dimensions (LF1) and (LF3) and by way of example can have contouring. This contouring can by way of example correspond to the geometry of the possible application, for example to the geometry of a refrigerator wall.

The dimensions (LF1) and (LF3) of the cavity are each greater than (LF2). It is preferable that the ratio of (LF1) to (LF2), and also the ratio of (LF3) to (LF2) is respectively mutually independently greater than 3, particularly preferably greater than 6.

The aperture connecting the cavity to the depressurization unit has an aspect ratio preferably of at least 2, particularly preferably of at least 5.

The apertures are particularly preferably elongate holes, or are gaps or slots. These apertures preferably have a constant gap width. They can, however, also be oval-shaped, banana-shaped, concave or convex, and can therefore have a width that changes along the length of the gap. It is particularly preferably that the at least one aperture in the wall (A3) between cavity and depressurization unit consists of a single aperture which extends across the entire dimension (LF1) of the cavity. However, it is also possible that there are combinations of apertures arranged in the direction of (LF1) behind one another and optionally alongside one another, for example apertures separated from one another by fillets. Less preference is given to a combination of apertures with an aspect ratio of about 1, e.g. round or slightly elliptical apertures, distributed across the length (LF1). By way of a change in gap width and, respectively, the local height of a restrictor (320) that may be present in the depressurization unit (300) it is possible to homogenize the flow resistance of the foam in the cavity across the entire length (LF1); this leads to a homogeneous velocity profile of gas flow in the cavity during the depressurization. This in turn leads to uniform rise of the foam across the entire length (LF1) of the cavity: this promotes homogeneous molding properties, and also complete filling of the cavity by foam.

It is preferable that the restrictor and the at least one aperture wall (A3) are situated centrally in the thickness (LF2) of the cavity.

A restrictor (320) moreover increases flow resistance to the rising foam; this contributes to a desired compaction of the foam in the gap provided by the restrictor, and reduces the risk of uncontrolled escape of the foam.

There is preferably an overflow region (330) adjacent to the optionally present restrictor (320). It is particularly preferable that the depressurization unit comprises an overflow (330) in which it is possible to collect the foamed reaction mixture that may be emerging from the at least one aperture of the cavity. This can then be removed concomitantly on removal of the molding. The overflow region (330) prevents contamination of the valve (310) arranged behind same, without any requirement for installation of an additional sieve and possibly replacement or cleaning of said sieve at regular intervals.

It has been found that in order to achieve advantageous component properties it is important to arrange for depressurization during the reaction in the mold. The compressed gas in the mold is controlled by the method according to the invention and, respectively, the mold according to the invention, and is conducted uniformly out of the mold cavity.

The method according to the invention achieves greater homogeneity of cell structure, without a requirement to increase production time; in particular it was possible to achieve significant reduction of undesired preferential orientations of the foam cells in regions close to the depressurization unit or to the depressurization valve. It was moreover possible to produce components which completely fill the cavity. If the position of the at least one aperture connecting the cavity to the depressurization region is not according to the invention, air inclusions are observed.

The PUR/PIR reaction mixture preferably comprises an isocyanate-reactive component A), which preferably comprises at least one polyol component A1) selected from the group consisting of polyether polyols, polyester polyols, polyetherester polyols, polycarbonate polyols and polyether polycarbonate polyols, and also a polyisocyanate as component B).

The proportion of primary OH functions, based on the total number of terminal OH functions of all polyols used in the component A), is preferably at least 30%.

The functionality f of the polyol component A1) is preferably >2.5. With polyol formulations in which the polyol component A1) has a functionality in said range, an ideal viscosity increase is obtained during injection in the period up to reduction of the counterpressure. The foams can moreover be rapidly demolded.

The hydroxy number of the polyol component A1) is preferably 280 to 600 mg KOH/g. This has a particularly advantageous effect on the mechanical properties of the foams.

The abovementioned polyether polyols are the polyether polyols that are known to the person skilled in the art and can be used in polyurethane/polyisocyanurate synthesis, or mixtures of different polyether polyols.

Examples of polyether polyols that can be used are polytetramethylene glycol poly ethers of the type obtainable via polymerization of tetrahydrofuran by means of cationic ring-opening. Equally suitable polyether polyols are adducts of styrene oxide, ethylene oxide, propylene oxide, butylene oxide and/or epichlorohydrin onto di- or polyfunctional starter molecules.

It is preferable that the isocyanate-reactive component A) comprises, based on its total weight, at least 50% by weight of polyether polyol. Components of this type feature particularly good resistance hydrolysis.

Polyetherester polyols that can be used are those compounds that comprise ether groups, ester groups and OH groups. Organic dicarboxylic acid having up to 12 carbon atoms or derivatives thereof are suitable for the production of said polyether ester polyols. Polyether polyols used as further components for the production of the polyetherester polyols are obtained by alkoxylation of starter molecules such as polyhydric alcohols. The starter molecules are at least difunctional, but can optionally also comprise portions of starter molecules which have higher functionality, in particular which are trifunctional. Polyetherester polyols can also be produced via alkoxylation of reaction products obtained by the reaction of organic dicarboxylic acids and derivatives of these and components with Zerevitinov-active hydrogens.

Suitable polyester polyols are inter alia polycondensates of di- and moreover tri- and tetraols and di- and moreover tri- and tetracarboxylic acids or hydroxycarboxylic acids or lactones. For the production of the polyesters it is also possible to use, instead of the free polycarboxylic acids, the corresponding polycarboxylic anhydrides or corresponding polycarboxylic esters of lower alcohols.

In particular, it is also possible to use biobased starting materials and/or derivatives of these for the production of the polyester polyols. Particular preference is given to esters of ricinoleic acid with polyfunctional alcohols, for example glycerol.

Polycarbonate polyols that can be used are polycarbonates having hydroxy groups, for example polycarbonate diols. These are obtainable via reaction of carbonic acid derivatives, such as diphenyl carbonate, dimethyl carbonate or phosgene, with polyols, preferably diols, or via copolymerization of alkylene oxides, for example propylene oxide, with $CO_2$.

It is also possible to use, instead of or in addition to pure polycarbonate diols, polyether polycarbonate diols which for example are obtainable via copolymerization of alkylene oxides, for example propylene oxide, with $CO_2$.

The isocyanate-reactive component A) can moreover comprise low-molecular-weight isocyanate-reactive compounds A2); in particular, it is possible to use di- or trifunctional amines and alcohols with molar masses $M_n$ of less than 400 g/mol.

The component A) can comprise, alongside the polyols and isocyanate-reactive compounds described above, other isocyanate-reactive compounds, for example graft polyols, polyamines, polyamino alcohols and polythiols.

A preferred isocyanate-reactive component A) consists of at least 65% by weight, in particular at least 80% by weight and very particularly preferably at least 90% by weight of the polyol component A1), which has a hydroxy number of 280 to 600 mg KOH/g and a functionality f of ≥2.8 to ≤6.0, and the proportion of primary terminal OH functions in the component A) is at least 35% (based on all terminal OH functions in the component A).

The component A) can comprise auxiliaries and additives, for example cell-opening compounds, preferably in quantities of at most 1% by weight based on the isocyanate-reactive component A).

Other auxiliaries and additives are the auxiliaries and additives that are usual and known from the prior art and known to the person skilled in the art; for example surface-active substances, stabilizers, in particular foam stabilizers, cell regulators, fillers, dyes, pigments, flame retardants, antistatic agents, hydrolysis stabilizers and/or substances having fungistatic and bacteriostatic reaction.

It is preferable that catalysts are also used for the production of the rigid PUR/PIR foam. Compounds usually used as catalysts accelerate the reaction of the compounds comprising hydroxy groups or isocyanate-reactive groups in the components with the isocyanate groups of the component B.

For formation of the foam in the production of the rigid PUR/PIR foam, a blowing agent component is used. The quantity used as said component is that required to achieve a dimensionally stable foam matrix and the desired envelope density. Materials used as blowing agents are preferably physical blowing agents (for example pentane) and/or $CO_2$ in the supercritical state. It is also possible to use chemical blowing agents (e.g. water) in addition to, or instead of, the physical blowing agents.

The component B) is a polyisocyanate, i.e. an isocyanate having an NCO functionality of ≥2. Examples of such polyisocyanates are butylene 1,4-diisocyanate, pentane 1,5-diisocyanate, hexamethylene 1,6-diisocyanate (HDI), isophorone diisocyanate (IPDI), trimethylhexamethylene 2,2,4- and/or 2,4,4-diisocyanate, the isomeric bis(isocyanatocyclohexyl)methanes or mixtures of these having any desired isomer content, cyclohexylene 1,4-diisocyanate, phenylene 1,4-diisocyanate, tolylene 2,4- and/or 2,6-diisocyanate (TDI), naphthylene 1,5-diisocyanate, diphenylmethane 2,2'- and/or 2,4'- and/or 4,4'-diisocyanate (MDI) and/or higher homologs, 1,3- and/or 1,4-bis(2-isocyanatoprop-2-yl)benzene (TMXDI), 1,3-bis(isocyanatomethyl)benzene (XDI) and also alkyl 2,6-diisocyanatohexanoates (lysine diisocyanates) having C1- to C6-alkyl groups.

Materials used as isocyanate component B) are preferably mixtures of the isomers of diphenylmethane diisocyanate ("monomeric MDI", abbreviated to "mMDI") and its oligomers ("oligomeric MDI"). The term "polymeric MDI" (pMDI) is in general used for mixtures of monomeric MDI and oligomeric MDI. The oligomers of MDI are polyphenyl polymethylene polyisocyanates having a relatively large number of rings, i.e. mixtures of the homologs of diphenylmethane diisocyanate which have a relatively large number of rings and which have an NCO functionality f>2 and have the following structure formula: $C_{15}H_{10}N_2O_2 [C_8H_5NO]_n$, where n=integer>0.

It is also possible to make a concomitant use of proportions of modified diisocyanates having uretdione structure, isocyanurate structure, urethane structure, carbodiimide structure, uretonimine structure, allophanate structure, biuret structure, amide structure, iminooxadiazinedione structure and/or oxadiazinetrione structure, alongside the abovementioned polyisocyanates.

Suitable NCO prepolymers can also be used as organic isocyanate component B), instead of or in addition to the abovementioned polyisocyanates. The prepolymers can be produced via reaction of one or more polyisocyanates with one or more polyols, where these correspond to the polyols described as components A1).

The number of NCO groups in the polyisocyanate component B) and the number of isocyanate-reactive groups of the component A) may be in a numerical ratio to one another that is by way of example ≥50:100 to ≤500:100. The rigid polyurethane foams are generally produced by reacting the components A) and B) in quantities such that the isocyanate index in the formulation is 80-150. The quantities reacted of the components A) and B) for the production of foams with a high proportion of isocyanate groups is generally such that the isocyanate index of the formulation is 150-400.

The method according to the invention can provide areal rigid PUR/PIR foam moldings with an envelope density of 25 to 300 kg/m$^3$, which at the same time have many open and particularly small cells. It is thus possible to produce rigid foams with an open-cell factor of >70% in which the average diameter of the cells is <180 μm. The foams have good mechanical properties, for example good compressive strengths and low thermal conductivities.

In relation to the compositions of the PUR/PIR reaction mixtures preferably used, reference is in particular made to WO 2018162372 A1. That document describes in detail the PUR/PIR reaction mixtures that are preferably used.

FIG. 1 shows the structure, in principle known, of a molding (10) which has a cavity (100). Molds of this type are known per se. They have an inlet aperture (110) and a valve (130).

Figure 2:
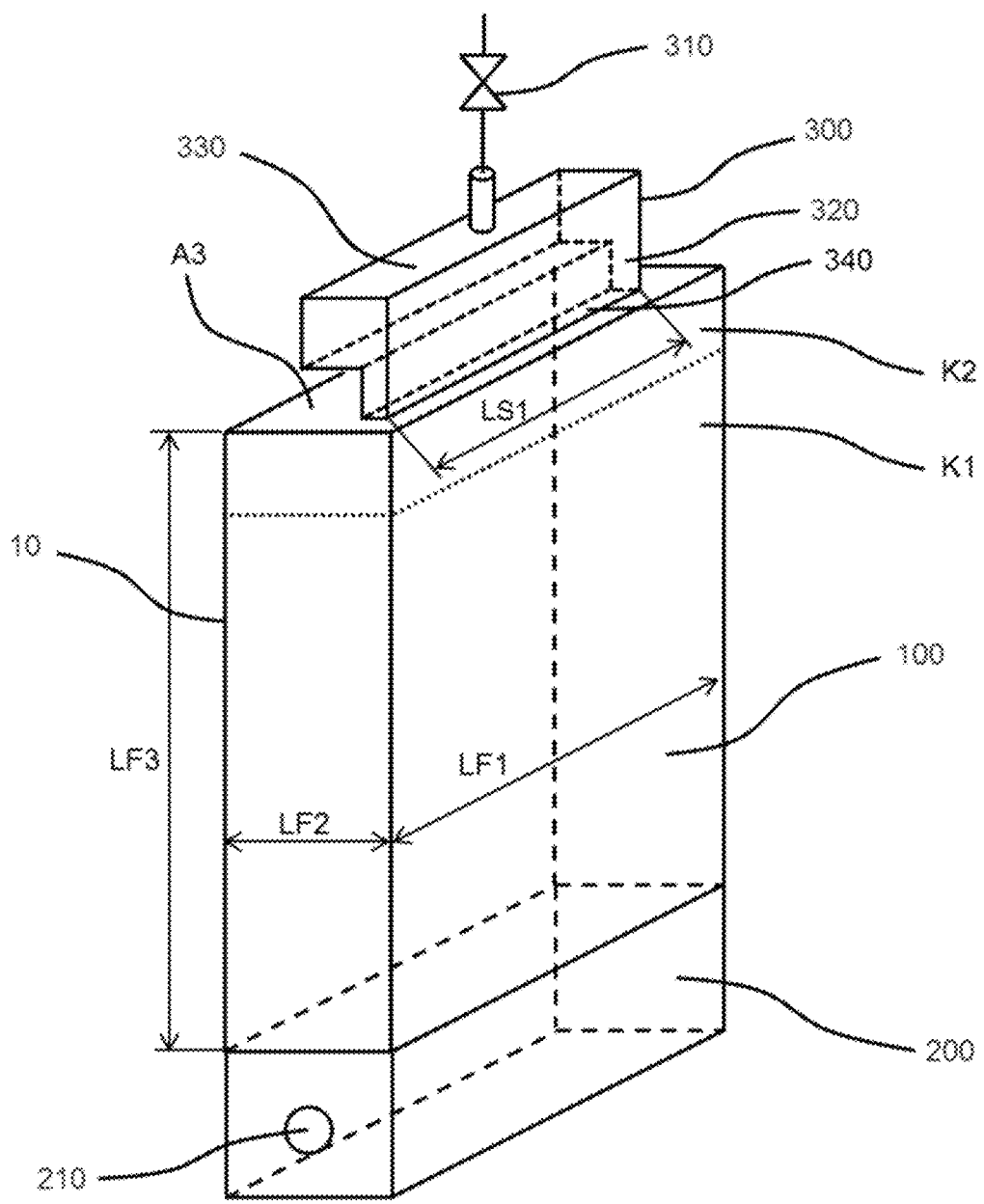
FIG. 2 illustrates a mold (10) according implementations of the invention in which cavity (100) has a width (LF1) and a height (LF3), a thickness (LF2), a wall (A3) which has an aperture (340) which connects the cavity (100) and the depressurization unit (300), in which the depressurization unit (300) has a valve (310), a restrictor (320) and an overflow region (330)

FIG. 2 reveals a mold (10) according to the invention. The cavity (100) has a width (LF1) and a height (LF3), and also a thickness (LF2). The cavity (100) has a wall (A3) which has an aperture (340) which connects the cavity (100) and the depressurization unit (300). The depressurization unit (300) shown in FIG. 2 has a valve (310), a restrictor (320) and an overflow region (330).

FIG. 2 moreover reveals by way of example the region K2 in which at least one aperture is preferably located if it is not located in the wall that, in the main flow direction, is opposite to the region comprising the inlet aperture.

Figure 3:
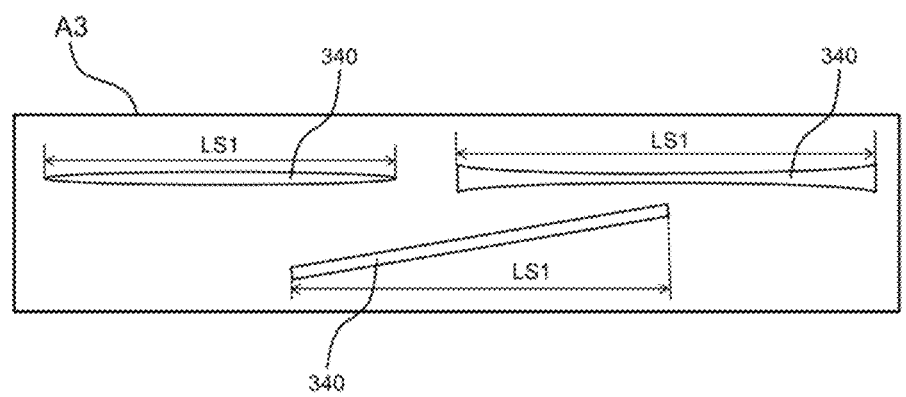
FIG. 3 illustrates wall (A3) of cavity (100) in which the wall (A3) comprises a plurality of apertures (340) which have different shapes, the apertures having a length (LS1) in the direction of the length (LF1) of the cavity (100)

FIG. 3 shows the wall (A3) of the cavity (100). This wall (A3) comprises a plurality of apertures (340) which have different shapes. The apertures respectively have a length (LS1) in the direction of the length (LF1) of the cavity (100).

Figure 4:
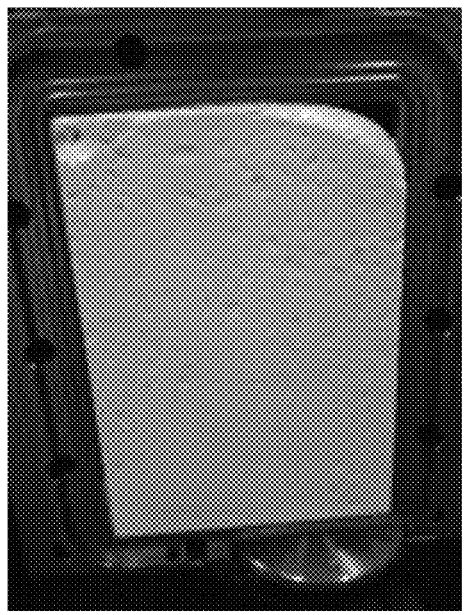
FIG. 4 shows the result of the comparative example.

FIG. 4 shows the result of the comparative example.

Figure 5:
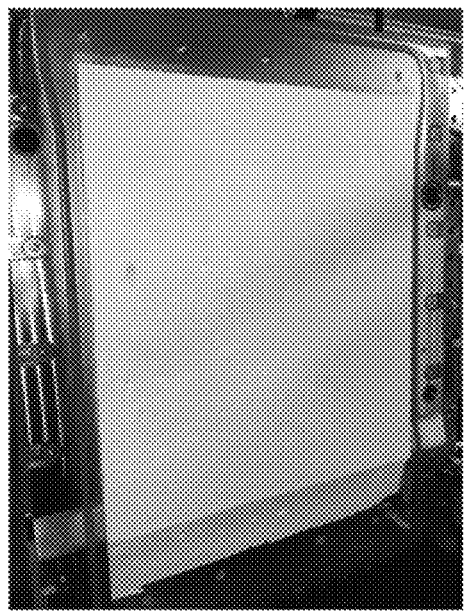
FIG. 5 shows the result of the example according to the invention.

FIG. 5 shows the result of the example according to the invention.

The invention will now be explained in more detail with reference to the following examples.

Comparative Example

Foams were produced with a mold with a panel-shaped cavity from the prior art, where the depressurization took place by way of a valve attached eccentrically on the wall (A3) of the cavity by way of a round aperture serving for outflow of air. The temperature of the mold is controlled to about 55° C. The polyol formulation A (inclusive of an addition of $CO_2$ blowing agent) and the isocyanate component B (see table 1 for composition) were mixed with one another in a high-pressure mixing head in the experiments (see table 1 for method parameters).

The injection of the mixture (method step i)) took place by way of a round injection aperture at the base of the cavity onto a baffle plate within a period of 2.5 s and at about 160 bar and about 40° C. The pressure in the cavity in this phase was about 8 bar.

After a waiting time of 3.5 s, the cavity pressure was reduced to ambient pressure within a period of 2 s (method step ii)). The depressurization caused expansion of the $CO_2$; the foam was produced, and expanded within the cavity. The component could be demolded after it had cooled (method step iii)).

The foamed moldings produced with this mold and with the process conditions described in table 1 exhibited cells of elongated shape oriented in the direction of the aperture. The average density of the foam was 81 kg/m$^3$.

The ratio of area enclosed by the aperture to area enclosed by the wall was 1:13. The ratio of the length LS1 of the aperture to the length LF1 of the cavity was 1:5.25.

Although a sufficient quantity of composition was injected, the cavity was not completely filled by the foam. The corner of the wall A3 opposite to the outlet was not filled (cf. FIG. 4).

Example (According to the Invention)

The comparative experiment was repeated, but the mold according to the invention was used. The mold was enlarged, and in particular here the increase of the dimension LF1 made the depressurization process more demanding than for the process in the smaller mold. It was therefore necessary to make appropriate adjustments to various method parameters (pressure, shot time, waiting time) in order to achieve comparable foam properties, in particular a comparable density.

The injection took place in the inlet region by way of a sprue-type gating system positioned along the cavity width (LF1). The transition from the sprue-type gating system to the prescribed depth of the cavity (LF2) was achieved by way of a convergently opening slot. The mixture was injected at about 51° C. (polyol) and about 35° C. (isocyanate), and at a pressure of about 155 bar. The mold was temperature-controlled to 53° C.; the internal pressure in the cavity was 8 bar.

The depressurization unit of the mold used had a slot-shaped aperture becoming narrower toward the center and leading to the cavity. The ratio of area included by the aperture to the area included by the wall was 915:50400 (1:55). The ratio of the length LS1 of the aperture to the length LF1 of the cavity was 1:1.

The foam cells in the molding were not oriented, and had a uniform shape, and also a narrow size distribution. The cavity was filled completely and uniformly (cf. FIG. 5).

TABLE 1

| | Example | |
|---|---|---|
| | Comparative example | Example according to the invention |
| Isocyanate [parts by mass] | 97.19 | 97.19 |
| Polyol 1 [parts by mass] | 13 | 13 |
| Polyol 2 [parts by mass] | 32.50 | 32.50 |
| Polyol 3 [parts by mass] | 50 | 50 |
| Stabilizer [parts by mass] | 1.5 | 1.5 |
| $CO_2$ blowing agent [parts by mass] | 5.16 | 5.16 |
| Cell-opener 1 [parts by mass] | 0.4 | 0.4 |
| Cell-opener 2 [parts by mass] | 0.1 | 0.1 |
| Catalyst 1 [parts by mass] | 2.5 | 2.5 |
| Catalyst 2 [parts by mass] | 1.65 | 1.65 |
| Mold pressure [bar] | 8 | 8 |
| Pressure on polyol side [bar] | 164 | 155 |
| Pressure on isocyanate side [bar] | 159 | 159 |
| Mold temperature [° C.] | 55 | 53 |
| Temperature on polyol side [° C.] | 47 | 51 |

TABLE 1-continued

| | Example | |
|---|---|---|
| | Comparative example | Example according to the invention |
| Temperature on isocyanate side [° C.] | 35 | 35 |
| Shot time [s] | 2.5 | 3.4 |
| Waiting time [s] | 3.5 | 1.6 |
| Depressurization time [s] | 2 | 2 |
| Ratio of area included, aperture:A3 | 1:13 | 1:55 |
| Ratio of length of cell opening LS1:LF1 | 1:(5.25) | 1:1 |
| Ratio of LF1:LF2 | 210:80 | 630:80 |
| Ratio of LF3:LF2 | 300:80 | 740:80 |
| Molding density [kg/m$^3$] | 81 | 80 |

For the purposes of this application, the shot time is the duration of injection.

For the purposes of this application, the waiting time is the time to the end of injection and the start of depressurization.

The chemicals used in the experiments were:

Isocyanate: Desmodur®44V20L from Covestro Deutschland AG, mixture of monomeric and polymeric MDI with a viscosity between 160-240 mPa·s (25° C.) and with 30.5-32.5% by weight NCO content.

Polyol 1: Polyether polyol based on trimethylolpropane and propylene oxide with a hydroxy number of 800 mg KOH/g, a functionality of 3 and a viscosity of 6100 mPa·s at 25° C.

Polyol 2: Polyether polyol based on trimethylolpropane and ethylene oxide with a hydroxy number of 550 mg KOH/g, a functionality of 3 and a viscosity of 505 mPa·s at 25° C.

Polyol 3: Mixture of:
- 27% by weight of polyether polyol based on 1,2-propanediol and propylene oxide with a hydroxy number of 56 mg KOH/g, a functionality of 2 and a viscosity of 310 mPa·s at 25° C.
- 19% by weight of polyether polyol based on 1,2-propanediol and propylene oxide with a hydroxy number of 112 mg KOH/g, a functionality of 2 and a viscosity of 140 mPa·s at 25° C.
- 54% by weight of polyether polyol based on glycerol and propylene oxide with a hydroxy number of 231 mg KOH/g, a functionality of 3 and a viscosity of 350 mPa·s at 20° C.

Stabilizer: Tegostab® B 8443, foam stabilizer from Evonik Industries AG, based on polyether polydimethylsiloxanes Cell opener 1: Ortegol 500 from Evonik Industries AG, organic polymer based on polybutadiene Cell opener 2: Ortegol 501 from Evonik Industries AG, mixture of amine-stabilized, macromolecular, unsaturated hydrocarbons with phthalic ester Catalyst 1: Desmorapid 1792 from Covestro Deutschland AG, based on potassium acetate in diethylene glycol Catalyst 2: Dabco NE1070 from Evonik Industries AG, based on dimethylaminopropylurea

What is claimed is:

1. A method for producing a production of foamed areal polyurethane/polyisocyanurate molding with a thickness (LF2) in a mold (10), comprising an inlet region, a cavity (100) and a depressurization unit (300), the method comprising:

i) injecting a polyurethane/polyisocyanurate reaction mixture through at least one inlet aperture (110, 210) in the inlet region and into the cavity (100) of the mold (10), said cavity being under an initial pressure of 5 bar to 40 bar, ii) after the injection of the polyurethane/polyisocyanurate reaction mixture, carrying out a depressurization in the cavity (100) for 0.1 to 10 seconds by means of at least one valve (310) in the depressurization unit (300), to atmospheric pressure or to a pressure which is lower than the initial pressure and which is 1 bar to 5 bar, wherein the polyurethane/polyisocyanurate reaction mixture foams along a main flow direction from the inlet region through the cavity (100) to the depressurization unit (300), and iii) hardening, cooling and demolding the foamed areal polyurethane/polyisocyanurate molding, wherein
the cavity has two long dimensions (LF1 and LF3) and one dimension (LF2) that is short in comparison therewith, and one of the long dimensions (LF3) represents the main flow direction of the foam,
the cavity (100) has at least one wall (A3) in the plane which contains the dimensions (LF1) and (LF2), or has at least one portion (K2) of a wall (A2) in a plane which contains the dimensions (LF1) and (LF3), where the at least one portion (K2) of the wall (A2) corresponds to the area which extends in the dimension (LF3) across that one-tenth part of the wall (A2) that is opposite to the inlet region, and where the at least one wall (A3) or at least one portion (K2) of a wall (A2) has at least one aperture (340) which connects the cavity (100) and the depressurization unit (300),
the ratio of the sum of the areas of the at least one aperture (340) to the area of the wall (A3) comprising said aperture or of the at least one portion (K2) of the wall (A2), where said at least one portion (K2) comprises said aperture, is 1:20 to 1:100,
the at least one aperture (340) has a length (LS1) in the direction of the long dimension (LF1) of the cavity (100), and
the ratio of the length (LS1) or, respectively, of the sum of the length (LS1) of the at least one aperture (340) to the long dimension (LF1) of the cavity (100) is greater than 1:4.

2. The method as claimed in claim 1, where the ratio of the long dimension (LF1) of the cavity (100) to the short dimension (LF2), and also the ratio of the long dimension (LF3) of the cavity (100) to the short dimension (LF2) is respectively mutually independently greater than 3:1.

3. The method as claimed in claim 1, where the at least one aperture (340) connecting the cavity (100) to the depressurization unit (300) has an aspect ratio of at least 2.

4. A mold for the production of foamed areal polyurethane/polyisocyanurate moldings with a thickness (LF2), comprising:

(i) an inlet region with at least one inlet aperture (110, 210),
(ii) a cavity (100) adjacent to the inlet region, and
(iii) a depressurization unit (300) with at least one valve (130, 310), wherein
the cavity (100) has two long dimensions (LF1) and (LF3) and one dimension (LF2) that is short in comparison thereto,
the cavity (100) has at least one wall (A3) in a plane which contains the dimensions (LF1) and (LF2), or has at least one portion (K2) of a wall (A2) in the plane which contains the dimensions (LF1) and (LF3), where the at least one portion (K2) of the wall (A2) corresponds to the area which extends in the dimension (LF3) across that one-tenth part of the wall (A2) that is opposite to the inlet region, and where the at least one wall (A3) or at least one portion (K2) of a wall (A2) has at least one aperture (340) which connects the cavity (100) and the depressurization unit (300), the ratio of the sum of the areas of the at least one aperture (340) to the area of the wall (A3) comprising said aperture or of the at least one portion (K2) of the wall (A2), where said at least one portion (K2) comprises said aperture, is 1:20 to 1:100, the at least one aperture (340) has a length (LS1) in the direction of the long dimension (LF1) of the cavity (100), and the ratio of the length (LS1) or, respectively, of the sum of the length (LS1) of the at least one aperture (340) to the long dimension (LF1) of the cavity (100) is greater than 1:4.

5. The mold as claimed in claim 4, where the ratio of the long dimension (LF1) of the cavity to the short dimension (LF2), and also the ratio of the long dimension (LF3) of the cavity to the short dimension (LF2) is respectively mutually independently greater than 3:1.

6. The mold as claimed in claim 4, wherein the at least one aperture (340) connecting the cavity (100) to the depressurization unit (300) has an aspect ratio of at least 2.

\* \* \* \* \*